United States Patent [19]

Deaver

[11] 4,453,762
[45] Jun. 12, 1984

[54] LOUVER CONSTRUCTION

[76] Inventor: Dann T. Deaver, 20565 Williamsburg Ct., Harper Woods, Mich. 48236

[21] Appl. No.: 419,460

[22] Filed: Sep. 17, 1982

[51] Int. Cl.³ .............................................. B60J 3/00
[52] U.S. Cl. .................................... 296/97 A; 52/473
[58] Field of Search ............. 296/97 A, 97 R; 52/473; 49/62, 63, 64

[56] References Cited

U.S. PATENT DOCUMENTS

| 4,006,933 | 2/1977 | Simpson | 52/473 |
| 4,081,937 | 4/1978 | Koch | 296/97 A |
| 4,121,869 | 10/1978 | Hablitzel et al. | 296/97 R |
| 4,368,605 | 1/1983 | Ulrich | 52/473 |

FOREIGN PATENT DOCUMENTS 2407456  8/1975  Fed. Rep. of Germany .

Primary Examiner—Robert R. Song
Attorney, Agent, or Firm—Harness, Dickey & Pierce

[57] ABSTRACT

A louver assembly adapted to be mounted to the rear window assembly of an automotive vehicle having a pair of integrally formed, one piece end cap unit and a plurality of elongated channel members, the end cap unit having a plurality of identical right hand end caps and a plurality of similar but reverse formed left hand end caps, a detent structure for locating and locking the channel members in alignment with the associated one of the end caps with resilient bias means for enhancing the lock and minimizing noise, the channel member being of a preselected length to connect right hand and left hand end caps in a predetermined spaced relationship whereby the louver assembly will be of the desired width to fit the rear window assembly, the end cap units being of a preselected length to provide a selected number of end caps whereby the louver assembly will be of the desired length to fit the rear window assembly, the end cap units being generally flexible between adjacent end caps whereby the end cap units can fit the vertical sweep the rear window, the channel members formed to provide a horizontal sweep, the end caps having tongue members adapted to be received within the associated ends of the channel members and being tapered to permit acceptance of the channel member ends over a wide range of angles while still providing support, guide means operative between the tongues of the end caps and the channel members to guide the same into engagement and including a blocking structure to preclude assembly of the channel members onto the tongues with the sweep in the wrong direction.

29 Claims, 9 Drawing Figures

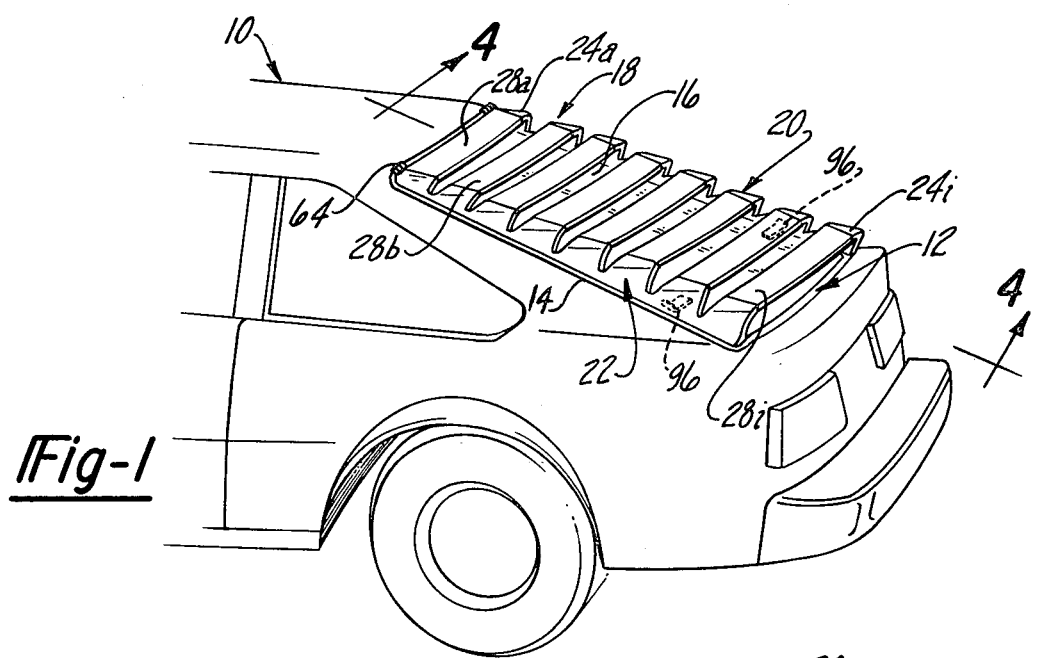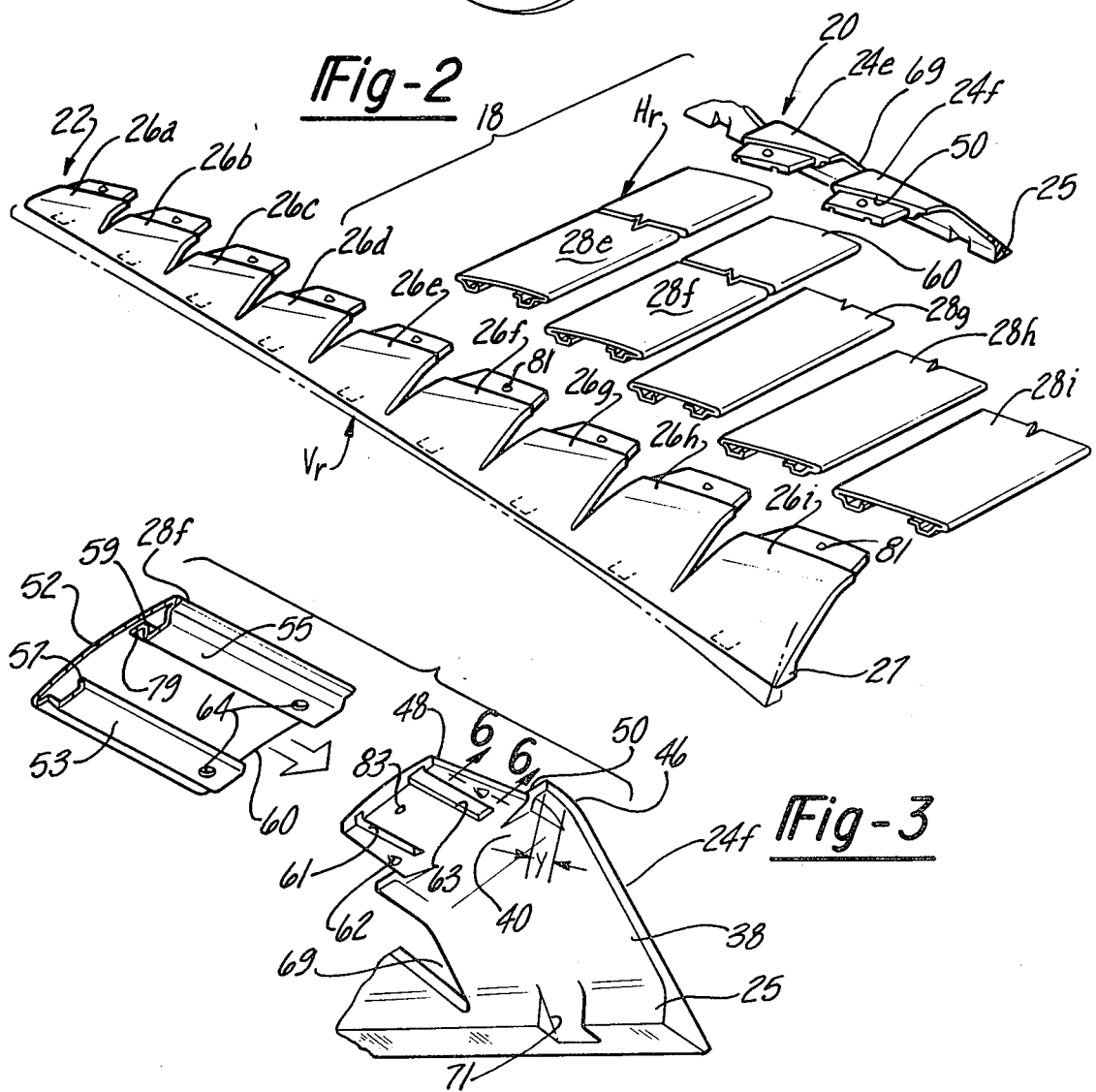

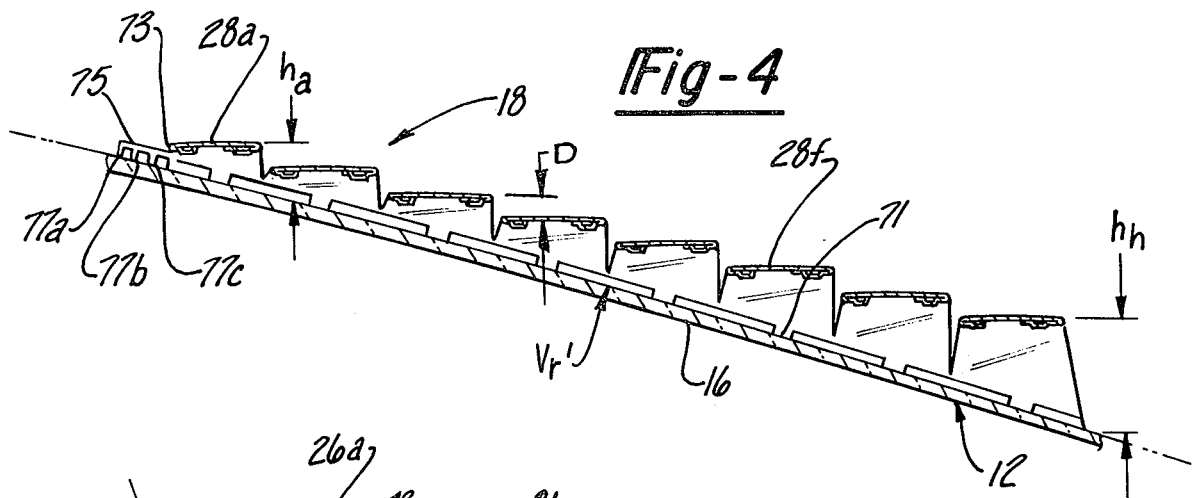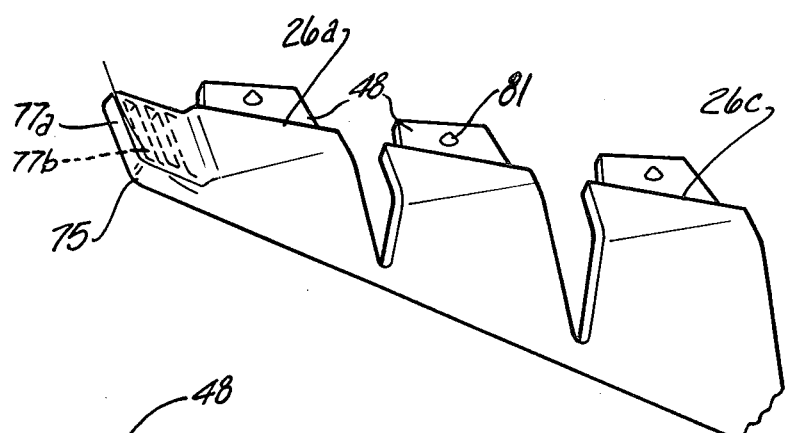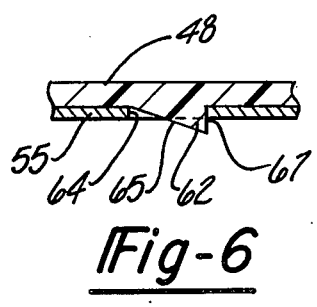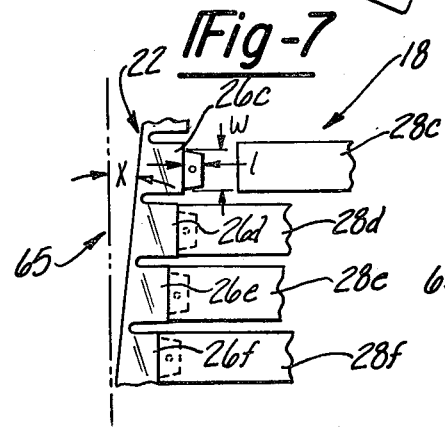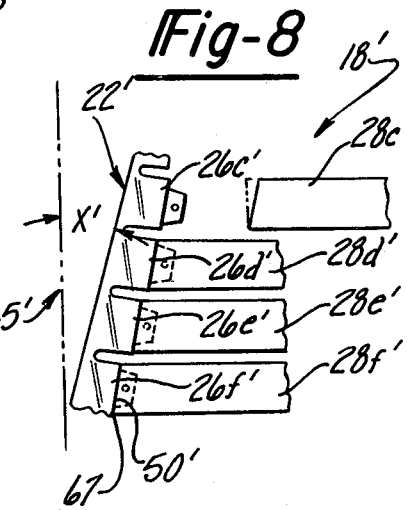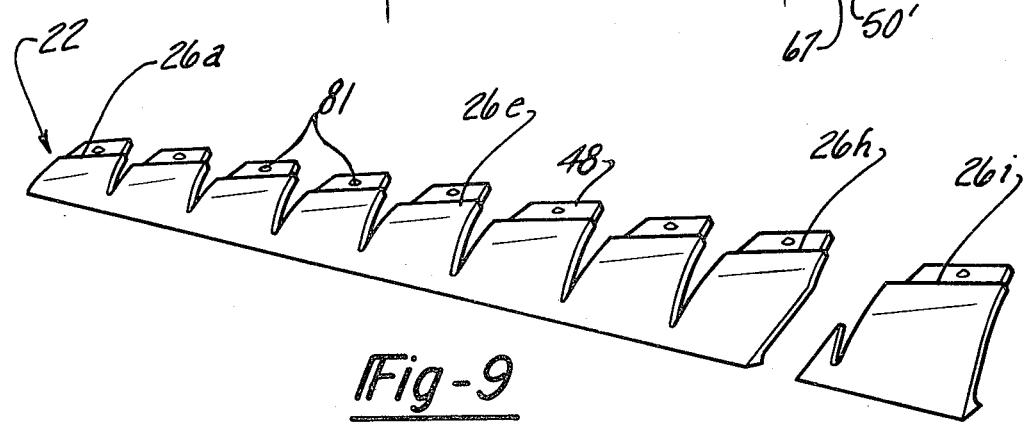

4,453,762

LOUVER CONSTRUCTION

BACKGROUND AND SUMMARY OF THE INVENTION

The present invention relates to a louver construction for the rear window of an automobile.

The present invention is related to my copending patent application Ser. No. 419,083, filed Sept. 16, 1982 for Louver Construction and that disclosure is incorporated herein by reference.

It is common in automobile designs to provide a substantially large rear window area. Such a rear window area permits heat build up in the vehicle which can be objectionable especially during the warm seasons. Louver structures have been used on rear windows to minimize such heat build up and in fact have been and are being used for the latter reason as well as other reasons including greater privacy, rear passenger comfort (again from the sun), etc.

The present invention is an improved rear window louver construction which can be readily adapted for diferent window shapes. The improved rear window louver also provides sufficient center and vertical clearance to permit the continued use of rear window windshield wipers.

The louver of the present invention is a simple construction which lends itself to easy assembly and also to compact "knock down" packaging and is of a 'fool proof' design to minimize the chance of improper assembly.

The louver design of the present invention has significant flexibility and versatility and can, with slight modification, accommodate the different shapes, i.e. width, length, etc., of various rear windows. The design is particularly useful for accommodating changes in vertical sweep (i.e. top to bottom curvature) of various rear windows.

It is an object of the present invention to provide a louver design which can be readily adapted to rear windows of varying shapes and contours.

It is still another object of the present invention to provide a louver of a simple construction which lends itself to easy assembly and to compact "knock down" packaging while still permitting the use of generally common components on a number of different rear window shapes.

It is another object of the present invention to provide a louver construction which is of a construction which inhibits the possibility of improper assembly.

It is an object of the present invention to provide a louver construction for the rear window of an automobile which permits use of rear window windshield wipers.

It is another object of the present invention to provide a louver construction which is readily removable from the rear window.

It is a general object of the present invention to provide an improved louver construction for rear windows of automobiles.

Other objects, features and advantages of the present invention will become apparent from the subsequent description and the appended claims, taken in conjunction with the accompanying drawings, in which:

FIG. 1 is a fragmentary pictorial view of the rear portion of an automobile including the rear window area and further including a louver assembly of the present invention;

FIG. 2 is a partially exploded pictorial view of end cap units and louver channels of the louver assembly of FIG. 1;

FIG. 3 is a pictorial view, to enlarged scale, depicting the preassembled relationship of a portion of an end cap unit and louver channel;

FIG. 4 is a fragmentary sectional view to enlarged scale of the louver assembly taken generally along the lines 4—4 in FIG. 1;

FIG. 5 is a fragmentary, pictorial view to enlarged scale of the upper portion of one of the end cap units of FIG. 2;

FIG. 6 is a sectional view to enlarged scale of a locking, detent construction between the louver channel and end cap unit and generally taken along the lines 6—6 in FIG. 3;

FIG. 7 is a fragmentary elevational view of the louver assembly of FIG. 1 during assembly and depicting the end cap units at one angle;

FIG. 8 is a fragmentary elevational view of louver assembly similar to that of FIG. 7 with the angle of the end cap units being greater than that shown in FIG. 7; and FIG. 9 is a pictorial view of and end cap unit modified to accommodate a window assembly of different length than that shown in FIG. 1.

DESCRIPTION OF THE PREFERRED EMBODIMENT

Looking now to FIG. 1 the rear portion of a vehicle 10 (only partially shown) includes a rear window assembly 12. The rear window assembly 12 includes a peripheral molding 14 and window 16. The window 16 is shown shaded for purposes of clarity; assembly 12 includes the necessary seals and associated support structure the details of which have been omitted for simplicity.

A louver assembly 18, embodying features of the present invention, is shown mounted to the rear window assembly 12. An exploded view of the louver assembly 18 can be seen in FIG. 2 and includes a pair of longitudinal right and left hand end cap units 20 and 22, respectively. The right and left hand end cap units 20 and 22 are of identical but reverse constructions. The end cap unit 20 is comprised of a plurality of longitudinally spaced end caps 24a–24i integrally formed and connected together via a longitudinally extending support base 25; similarly, end cap unit 22 has end caps 26a–26i connected together via support base 27. The end cap units 20 and 22 are of one piece integral constructions and in one form of the invention are formed of a high impact thermoplastic material by injection molding. Pairs of opposite end caps 24a and 26a, 24b and 26b, etc., are connected via elongated louver channels 28.

The end caps 24a–24i and 26a–26i provide a means of interconnecting the louver channels 28a–28i and are contoured such as to orient the louver channels 28a–28i generally horizontally. The horizontal orientation of louver channels 28 is provided to permit good rear vision for the vehicle driver, i.e. through the spaces between adjacent ones of louver channels 28a–28i. Each of the end caps is of a generally similar construction and thus for purposes of simplicity only the construction of end cap 24f will be described in detail. Thus looking now to FIG. 3 end cap 24f is generally L-shaped having a pair of leg portions 38 and 40. Downwardly (or generally vertically) extending leg portion 38 is formed integrally with the base 25.

A radiused transition portion 46 smoothly connects leg portions 38 and 40 such that it compensates for the angle of the glass 16 to locate leg portion 40 in a generally horizontal plane when the louver assembly 18 is located upon the rear window assembly 12. Thus the result is that the leg portions 38 and 40 are not "square" or "rectangular" since opposite edges are of different widths. However, the 'horizontal' or laterally extending leg portion 40 terminates in an elongated end section or tongue 48 which is generally tapered and which, as will be seen, functions to connect the end cap 24f with louver channel 28f. In FIG. 3 louver channel 28f is shown in a pre-assembled condition relative to end cap 24f. The tapered construction serves a purpose to be described. In general it can be seen that end section 48 is of a reduced width and is recessed on top to define a shoulder 50 (see FIG. 2).

The louver channel 28f can be roll formed from aluminum and includes a slightly bowed center portion 52 terminating in channel portions 53 and 55 located at opposite sides. Channel portions 53 and 55 are formed integrally with center portion 52, are relatively narrow and are adapted to receive the opposite sides of tongue 48. The channel portions 53 and 55 terminate in inwardly directed flanges 57 and 59, respectively, which are adapted to be received in locating grooves 61 and 63, respectively in tongue 48. With the flanges 57, 59 located in grooves 61, 63 the louver channel 28f will be laterally aligned and guided during assembly (in direction of the arrow in FIG. 3) to end cap 24f. While louver channel 28f has been described, the remaining louver channels are similarly constructed.

When the louver channel 28f is assembled to the end cap 24f its associated end surface 60 is adapted to engage the shoulder 50. The depth of shoulder 50 is approximately the same as the material thickness of the louver channel 28f so that a smooth surface is provided at the juncture. In order to avoid separation and gaps appearing, the louver channel 28f and end cap 24f are locked together with a detent type construction comprising molded projections 62 in tongue 48 and openings 64 in channel portions 53 and 55 adapted to lockingly receive projections 62 (see FIG. 6). Note that the projections 62 are inclined at their forward surfaces 65 in the direction of relative movement between the louver channel 28f and the tongue 48 to facilitate assembly. The flanges 53 and 55 are sufficiently flexibile to resiliently move over projection 62 permitting assembly. The opposite side of projections 62 define a generally transverse surface 67 which inhibits separation of louver channel 28f and tongue 48.

In order to provide for a uniformly contoured appearance when the louver channel 28f is assembled to the end cap 24f, the ends of the opposite sides of leg portion 40 of end cap 24f adjacent the tongue 48 are contoured for at least a portion thereof to have a stepped construction generally matching that at the opposite sides of louver channel 28f.

The assembly of end cap units 20, 22 and louver channels 28a–28i is quite simple and lends itself to ease of shipment and storage and for distribution in a 'kit' form. All that is required for final assembly is to insert the tongues (such as tongue 48) of end caps 24a–24i and 26a–26i into the ends of louver channels 28a–28i until detenting occurs (such as between projections 62 and indentations 64) and the louver assembly 18 is assembled and ready for installation onto the rear window assembly 12.

Louver assembly 18 includes a pair of hinge assemblies 64 (see FIG. 1) located at the top thereof which permit the louver assembly 18 to be pivoted away from the window assembly 12 for cleaning and/or maintenance purposes. The details of the hinge assemblies do not constitute a part of the present invention and are shown in detail in my copending application (supra).

The louver assembly 18 is further (removably) held in place by means of a pair of tie down assemblies 96 (see FIG. 1) located at opposite sides of louver assembly 18. The details of the tie down assemblies 96 do not constitute a part of the present invention and are shown in detail in my copending application (supra). The tie down assemblies 96 can be manipulated to permit pivoting of the louver assembly 18 about hinge assemblies 64 and/or removal.

Note that the channel portions (such as 53 and 55) extend longitudinally for the length of louver channels 28a–28i and provide substantial stiffness to bending and twisting whereby the need for intermediate supports along the length of the louver channels 28a–28i is obviated.

At the same time note that the end caps 24a–24i and 26a–26i are structured to locate the inner ends of the louver channels 28a–28i spaced a preselected distance from the rear window glass 16. The absence of any center support structure permits the continued use of rear windshield wipers in the clearance between the louver channels 28a–28i and the rear window glass 16.

The louver assembly 18 is shown with a window assembly 12 which is generally 'trapezoidal' in shape, i.e. wider at the bottom than at the top, and has a generally matching shape. This is accomplished simply by making the louver channels 28a–28i progressively longer. The components of louver assembly 18, however, are readily adaptable to accommodate window assemblies of different sizes and shapes.

For a window assembly of greater or lesser width, i.e. square, rectangular or trapezoidal, the louver channels 28a–28i can simply be cut to the desired length.

For a window assembly of greater or lesser length the end cap units 20 and 22 can be cut at their lower ends to the desired size. Thus end cap units 20 and 22 are molded to a uniform length and are then cut to size by removing one or more of the lower end caps, starting with end caps 24i and 26i; for in between lengths, the vertical leg portion (such as leg portion 38) can be cut to size, still leaving the horizontal leg portion and tongue (such as 40 and 48) whereby a louver channel 28 can still be received at that lowermost, remaining end cap (see FIG. 9).

It can be seen that by varying the angle of end cap units 20 and 22 (to accommodate different window assembly shapes) the tongues (such as 48) will not always extend along the same horizontal line as the associated louver channel 28. In this case the tongues (such as 48) will be angulated relative to the mating end of the associated louver channel 28 (see FIGS. 7 and 8). This can be seen in FIGS. 7 and 8 where FIG. 7 depicts the louver assembly 18 of FIGS. 1–3 (during assembly) and FIG. 8 depicts a louver assembly 18a for a different shaped window assembly. Thus in FIG. 8 components similar to like components in the embodiment of FIGS. 1–7 are given the same numeral designation with the addition of a prime. Thus in FIG. 7 the end cap unit 22 extends at an angle X with a line 65 which extends parallely to a vertical plane extending fore and aft through the center of the vehicle 10. At this angle X the horizontal leg portions (such as 40) and associated tongues (such as 48) extend generally at right angles to the line 65 and hence the tongues will extend generally along the same horizontal line as the louver channels (28). Thus the ends of each of the louver channels (28) are cut square relative to its length. In FIG. 8, the end cap unit 22' is oriented at a larger angle X' relative to fore and aft line 65'. Here the louver channels (such as 28c', 28d' etc.) are cut at the appropriate angle (as shown in phantom in FIG. 8) such that the end surfaces of the louver channels will be along the same line and will matingly engage end cap shoulders such as 50'. Of course the detent openings (such as 64) are formed after the louver channels are cut to the correct size and angle.

In general the angulation such as X and X' will vary from 0 degrees to 25 degrees for a wide range of vehicles. In order to minimize the mismatch in angles over this range, the end cap units 20 and 22 are formed such that the horizontal leg portions (such as 40) and associated tongues (such as 48) extend generally at right angles to the line 65 when the angle X is approximately 12.5 degrees or in the center of the expected range of angles for which the end cap units 20 and 22 are expected to be used.

It is desirable that the tongues (such as 48) be long to provide good, rigid end support to the louver channels (28). In this regard it is believed that the tongue length 'l' (see FIG. 7) should be at least around 30% of its maximum width 'w'. In a preferred form the tongue length is around 40% of its width 'w'. The width 'w' is also approximately 87.5% of the overall width of the associated louver channel (28). A rectangular shape for the tongues of adequate width would require a short tongue length to accommodate any significant range of angulation. In the present invention, however, the noted range of angulation, i.e. 0–25 degrees, can be accommodated with the desired percentage of support by tapering the tongues (48). In order to accommodate a mismatch in angles between the tongues (48) and louver channels (28) the guide grooves (such as 61 and 63 on tongue 48) are made of a sufficient width to permit entry of the guide flanges (such as 53 and 55 of louver 28f) at an angle. Note that the tapered structure also helps to accommodate variations in the horizontal sweep radius of the louver channels (28) from one window assembly to another.

With an assembly involving a mismatch in angles it is desirable to avoid the appearance of a sharp surface break at the forward juncture of the louver channel (28) and horizontal leg portion (40) of the end cap (24f). The sharp break, for example, would occur on opposite sides of the juncture line 67 in FIG. 8. This is avoided by maintaining the distance Y (see FIG. 3) of the horizontal leg portion 48 from the transition portion 46 (i.e. the end of the curved portion) to a minimum. In one form of the invention that distance Y was essentially zero.

Many window assemblies have a vertical sweep, i.e. radius of curvature such as radius Vr in FIG. 4. This radius can normally vary from flat (no radius) to around 75.125" (referred to as a No. 0 to No. 50 sweep). A No. 1 sweep would have a radius of curvature of 3600.06". In order for the louver assembly to be able to fit these various curvatures, the end cap units 20 and 22 are made flexible in a vertical plane.

Thus end cap unit 22 has its end caps 26a–26i generally separated from each other by deep V notches such as notch 69 in FIGS. 2 and 3 which extend to depth generally to the support base portion 25. Support base portion 25 has a relatively small vertical thickness such that it is flexible at the V notches. The depth of the V notch can be varied even to extend partially within base portion 25 in order to provide the desired flexibility. With this construction, the end cap unit 22 (and similarly, end cap unit 20) can be resiliently bent to accommodate the sweep of the associated rear window assembly. This can be seen by the radius Vr of the phantom representation of end cap unit 22 (as curved) in FIG. 2.

In order to prevent distortion in molding the end cap units 20 and 22, the base portions 25 and 27 are notched on the inside surface to form a plurality of notches 71. These notches 71 are located generally midway between adjacent V notches (69) and further enhance the flexibility of the end cap units 20 and 22 and their ability to conform to the curvature of the window assembly with which it is associated.

The vertical leg portions (such as 38) of end caps 26a–26i increase in height from ha to hi from top to bottom (see FIG. 4). This increase in height allows the back edge 73 of the uppermost louver channel 28a (associated with end caps 24a, 26a) to be located close to the surface of the window assembly 12. This results in a minimum clearance which minimizes wind noise, vibration etc., caused by air moving underneath the louver assembly 18 and also blocks out light. At the same time the increase in height at the bottom of the louver assembly 18 permits sufficient clearance to accommodate rear window windshield wipers. Note that while the vertical leg portions (such as 38) vary the height of successive louvers 28a–28i the distance D between adjacent louvers can be maintained the same.

The uppermost end of end caps 24a, 26a terminate in a generally flat portion 75 which is adapted to rest against the glass 16 of the rear window assembly 12. (See FIG. 4). The corner contour of different window assemblies, however, will be slightly varied. It is desirable to be able to reasonably accommodate that contour while still providing a generally finished surface and at the same time to provide an end surface which will block air flow to minimize wind noise. This is accomplished by providing flat portion 75 with a plurality of molded ribs 77a–77c (see FIGS. 4 and 5). The space between these ribs 77a–77c define cut lines at which the flat portion 75 can be trimmed while still leaving at least one of the ribs 77a–77c intact to provide a finished surface and a surface to block air flow and light.

In addition to the vertical sweep noted, it is common for rear window assemblies to have a horizontal sweep radius such as radius Hr in FIG. 2. This is accommodated by forming the louver channels 28a–28i to have the appropriate curvature (sweep). This means, however, that the louver channels 28a–28i must be assembled with the appropriate fore and aft orientation to the end caps 26a–26i, 24a–24i. These sweeps can be quite small and hence not readily detectable in assembly whereby a reverse assembly could be made. This potential for error in assembly is eliminated by providing the guide flanges (such as 57 and 59) of the louver channels (28f) to have different shapes. Looking now to FIG. 3 guide flange 59 is provided with a horizontal lip portion 79. This necessitates that guide groove 63 be wider in order to receive guide flange 59 and lip portion 79. The other guide flange 57, however, is narrower and hence its associated guide groove 61 is accordingly narrower. Thus guide groove 61 is wide enough to receive guide flange 57 but is not sufficiently wide to receive guide flange 59 and lip portion 79. In this way louver channels 28a-28i can only be assembled to the end caps 24a-24i, 26a-26i with the sweep radius oriented in the proper fore and aft direction.

It is desirable to minimize the possibility of rattling of the louver channels. This is accomplished by the use of a generally cone shaped plug 81 located in openings 83 in each of the tongues (such as 48), see FIGS. 2, 3 and 5. The plugs 81 are made of an elastomeric material and are readily, elastically deformable by the channel louvers upon installation on the associated tongues (48). The plugs 81, which are partially compressed upon assembly will elastically maintain the louver channels (28) in place and dampen the tendency for vibration. At the same time the plugs 81 will act as a spring to provide a bias on the channel louvers to further enhance the lock provided by the detent action of the detent projections (62) in detent openings (64).

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A louver construction adapted to be mounted to rear window assemblies of automotive vehicles including windows varying in height, width and shapes such as square, rectangular or trapezoidal, and having a top, a bottom and sides, the louver construction comprising a pair of end cap units and a plurality of elongated louver channels, said end cap units being of a one piece construction, one of said end cap units being of a right hand construction and the other being of a reverse, left hand construction, each of said end cap units comprising a plurality of longitudinally disposed integrally formed end caps, each of said end caps being generally L-shaped in cross section and having a downwardly extending leg portion and a laterally extending leg portion, a transition portion connecting said downwardly extending leg portion and said laterally extending leg portion to locate said laterally extending leg portion generally horizontally when the louver construction is mounted to a rear window assembly, said laterally extending end portion having a reduced section tongue adapted to be matably received within the end of an associated one of said louver channels, lock means located between said tongue and the mating end of said louver channel, said lock means positively locating said louver channel in alignment with the associated one of said end caps and securing said louver channel to said end cap, said louver channel member being of a preselected length to connect opposite ones of said end caps in said right and left hand end cap units in a predetermined spaced relationship whereby the louver assembly will be of the desired width to fit the rear window assembly, said right and left hand end cap units being of a preselected length having a selected number of associated end caps, said right and left hand end cap units being severable at selected positions along its length whereby a louver assembly can be formed of the desired length to fit a selected rear window assembly.

2. The louver construction of claim 1 with adjacent ones of said end caps being flexibly connected to each other to permit said right and left hand end cap units to follow variations in the vertical sweep of different rear windows.

3. The louver construction of claim 2 with the flexible connection permitting said right and left hand end cap units to follow a vertical sweep generally over the range of from a No. 0 to a No. 50 sweep.

4. The louver construction of claim 3 with said right and left hand end cap units being injection molded and having molded cavities intermediate the ends of each said end cap to minimize post molding deformation and to further provide flexibility to follow the selected vertical sweep.

5. The louver construction of claim 1 including elastomeric means located between said tongue and said louver channel for inhibiting relative movement therebetween.

6. The louver construction of claim 1 with said elastomeric means resiliently operative on said lock means for assisting the securing of said louver channel to said end cap.

7. The louver construction of claim 1 with said louver channels formed to be assembled with a selected fore and aft orientation, blocking means on said tongue and said louver channels to permit assembly of said louver channels on said tongues only with said selected fore and aft orientation.

8. The louver construction of claim 1 with said downwardly extending leg portions of said end caps successively increasing in length along said right and left hand end cap units from that end adapted to be located at the window top to that to be located at the bottom.

9. The louver construction of claim 8 with said uppermost of said end caps having its said downwardly extending leg portion a preselected short length to locate said associated end caps and louver channel proximate the window surface to inhibit air flow thereunder.

10. The louver construction of claim 9 with said leg portions increasing in length sufficiently to locate the bottom ones of said louver channels a preselected distance above the window to permit the use of rear window wipers.

11. The louver construction of claim 8 with the generally vertical distance between successive ones of said end caps and hence of successive ones of said louver channels being generally the same.

12. The louver construction of claim 1 with said right and left hand end cap units terminating in a generally flat portion at its end adapted to be located at the window top, said flat portion having a plurality of spaced ridges adapted to engage the window surface whereby different portions of said flat portion can be removed to accommodate different window shapes while still leaving at least one of said ridges to engage the window surface.

13. The louver construction of claim 1 with said right and left hand end units adapted to fit the sides of windows having angulations varying generally over a range of from 0 degrees to 25 degrees, said tongues being tapered to permit full insertion in the ends of associated louver channels without modification of said tongues.

14. The louver construction of claim 13 with said tongues being of preselected length to provide desired support for said louver channels whereby when the widest portion of said tongue is generally around 87.5% of the width of said louver channels the length of said tongue is at least in a range of around 30% to 40% of said widest portion of said tongue.

15. The louver construction of claim 14 with said tongues extending generally at right angles to a vertical plane extending generally fore and aft through the midpoint of the vehicle when said right and left hand end units are oriented generally at around 12.5 degrees to said vertical plane.

16. The louver construction of claim 1 with said lateral end portions having a minimal linear length at the aft end of said end caps.

17. The louver construction of claim 16 with said lateral end portions extending generally directly from said transition portion at the aft end of said end caps to a preselected length at the fore end of said end caps.

18. A louver construction adapted to be mounted to rear window assemblies of automotive vehicles including windows varying in shape comprising a pair of end cap units and a plurality of elongated louver channels, said end cap units being of a one piece construction, one of said end cap units being of a right hand construction and the other being of a reverse, left hand construction, each of said end cap units comprising a plurality of longitudinally disposed integrally formed end caps, each of said end caps being generally L-shaped in cross section and having a downwardly extending leg portion and a laterally extending leg portion, a transition portion connecting said downwardly extending leg portion and said laterally extending leg portion to locate said laterally extending leg portion generally horizontally when the louver construction is mounted to a rear window assembly, said laterally extending end portion having a reduced section tongue adapted to be matably received within the end of an associated one of said louver channels, lock means located between said tongue and the mating end of said louver channel, said lock means positively locating said louver channel in alignment with the associated one of said end caps and securing said louver channel to said end cap, said louver channel member being of a preselected length to connect opposite ones of said end caps in said right and left hand end cap units in a predetermined spaced relationship whereby the louver assembly will be of the desired width to fit the rear window assembly, said right and left hand end cap units being of a preselected length having a selected number of associated end caps, whereby a louver assembly can be formed of the desired length to fit the rear window assembly, adjacent ones of said end caps being flexibly connected to each other to permit said right and left hand end cap units to follow variations in the vertical sweep of different rear windows.

19. The louver construction of claim 18 with the flexible connection permitting said right and left hand end cap units to follow a vertical sweep generally over the range of from a No. 0 to a No. 50 sweep.

20. The louver construction of claim 19 with said right and left hand end cap units being injection molded and having molded cavities intermediate the ends of each said end cap to minimize post molding deformation and to further provide flexibility to follow the selected vertical sweep.

21. A louver construction adapted to be mounted to rear window assemblies of automotive vehicles including windows varying in width, comprising a pair of end cap units and a plurality of elongated louver channels, one of said end cap units being of a right hand construction and the other being of a reverse left hand construction, each of said end cap units comprising a plurality of longitudinally disposed end caps, each of said end caps being generally L-shaped in cross section and having a downwardly extending leg portion and a laterally extending leg portion, a transition portion connecting said downwardly extending leg portion and said laterally extending leg portion to locate said laterally extending leg portion generally horizontally when the louver construction is mounted to a rear window assembly, said laterally extending end portion having a reduced section tongue adapted to be matably received within the end of an associated one of said louver channels, lock means located between said tongue and the mating end of said louver channel, said lock means positively locating said louver channal in alignment with the associated one of said end caps and securing said louver channel to said end cap, said louver channel member being of a preselected length to connect opposite ones of said end caps in said right and left hand end cap units in a predetermined spaced relationship whereby the louver assembly will be of the desired width to fit the rear window assembly, said right and left hand end cap units being of a preselected length having a selected number of associated end caps, whereby a louver assembly can be formed of the desired length to fit the rear window assembly, elastomeric means located between said tongue and said louver channel for inhibiting relative movement therebetween.

22. The louver construction of claim 21 with said elastomeric means resiliently operative on said lock means for assisting the securing of said louver channel to said end cap.

23. A louver construction adapted to be mounted to rear window assemblies of automotive vehicles including windows varying in width, comprising a pair of end cap units and a plurality of elongated louver channels, one of said end cap units being of a right hand construction and the other being of a reverse, left hand construction, each of said end cap units comprising a plurality of longitudinally disposed end caps, each of said end caps being generally L-shaped in cross section and having a downwardly extending leg portion and a laterally extending leg portion, a transition portion connecting said downwardly extending leg portion and said laterally extending leg portion to locate said laterally extending leg portion generally horizontally when the louver construction is mounted to a rear window assembly, said laterally extending end portion having a reduced section tongue adapted to be matably received within the end of an associated one of said louver channels, lock means located between said tongue and the mating end of said louver channel, said lock means positively locating said louver channel in alignment with the associated one of said end caps and securing said louver channel to said end cap, said louver channel member being of a preselected length to connect opposite ones of said end caps in said right and left hand end cap units in a predetermined spaced relationship whereby the louver assembly will be of the desired width to fit the rear window assembly, said right and left hand end cap units being of a preselected length having a selected number of associated end caps, whereby a louver assembly can be formed of the desired length to fit the rear window assembly, said louver channels formed to be assembled with a selected fore and aft orientation, blocking means on said tongue and said louver channels to permit assembly of said louver channels on said tongues only with said selected fore and aft orientation.

24. The louver assembly of claim 23 with said blocking means including a pair of guide grooves on said tongue and a pair of longitudinally extending flanges on said louver channels adapted to be moved into said guide grooves during assembly of said louver channels to said tongues, one of said flanges being of a shape different than the other, one of said guide grooves shaped to accept only said one of said flanges and not said other of the flanges whereby a preselected fore and aft orientation of said louver channels will be provided.

25. The louver construction adapted to be mounted to rear window assemblies of automotive vehicles including windows varying in height, width and shapes such as square, rectangular or trapezoidal, and having a top, a bottom and sides, the louver construction comprising a pair of end cap units and a plurality of elongated louver channels, one of said end cap units being of a right hand construction and the other being of a reverse, left hand construction, each of said end cap units comprising a plurality of longitudinally disposed end caps, each of said end caps being generally L-shaped in cross section and having a downwardly extending leg portion and a laterally extending leg portion, a transition portion connecting said downwardly extending leg portion and said laterally extending leg portion to locate said laterally extending leg portion generally horizontally when the louver construction is mounted to a rear window assembly, said laterally extending end portion having a reduced section tongue adapted to be matably received within the end of an associated one of said louver channels, lock means located between said tongue and the mating end of said louver channel, said lock means positively locating said louver channel in alignment with the associated one of said end caps and securing said louver channel to said end cap, said louver channel member being of a preselected length to connect opposite ones of said end caps in said right and left hand end cap units in a predetermined spaced relationship whereby the louver assembly will be of the desired width to fit the rear window assembly, said right and left hand end cap units being of a preselected length having a selected number of associated end caps, whereby a louver assembly can be formed of the desired length to fit the rear window assembly, said right and left hand end units adapted to fit the sides of windows having angulations varying generally over a range of from 0 degrees to 25 degrees, said tongues being tapered to permit full insertion in the ends of associated louver channels without modification of said tongues.

26. The louver construction of claim 25 with said tongues being of preselected length to provide desired support for said louver channels whereby when the widest portion of said tongue is generally around 87.5% of the width of said louver channels the length of said tongue is at least in a range of around 30% to 40% of said widest portion of said tongue.

27. The louver construction of claim 26 with said tongues extending generally at right angles to a vertical plane extending generally fore and aft through the midpoint of the vehicle when said right and left hand end units are oriented generally at around 12.5 degrees to said vertical plane.

28. A louver construction adapted to be mounted to rear window assemblies of automotive vehicles including windows varying in height and width, comprising a pair of end cap units and a plurality of elongated louver channels, one of said end cap units being of a right hand construction and the other being of a reverse, left hand construction, each of said end cap units comprising a plurality of longitudinally disposed end caps, each of said end caps being generally L-shaped in cross section and having a downwardly extending leg portion and a laterally extending leg portion, a transition portion connecting said downwardly extending leg portion and said laterally extending leg portion to locate said laterally extending leg portion generally horizontally when the louver construction is mounted to a rear window assembly, said laterally extending end portion having a reduced section tongue adapted to be matably received within the end of an associated one of said louver channels, lock means located between said tongue and the mating end of said louver channel, said lock means positively locating said louver channel in alignment with the associated one of said end caps and securing said louver channel to said end cap, said louver channel member being of a preselected length to connect opposite ones of said end caps in said right and left hand end cap units in a predetermined spaced relationship whereby the louver assembly will be of the desired width to fit the rear window assembly, said right and left hand end cap units being of a preselected length having a selected number of associated end caps, whereby a louver assembly can be formed of the desired length to fit the rear window assembly, said lateral end portions having a minimal linear length at the aft end of said end caps.

29. The louver construction of claim 28 with said lateral end portions extending generally directly from said transition portion at the aft end of said end caps to a preselected length at the fore end of said end caps.

* * * * *